April 16, 1940.   A. A. TUNLEY ET AL   2,197,327
TRANSPORTING GOODS FROM A CHOCOLATE COATING OR LIKE MACHINE
Filed Aug. 17, 1938    12 Sheets-Sheet 1
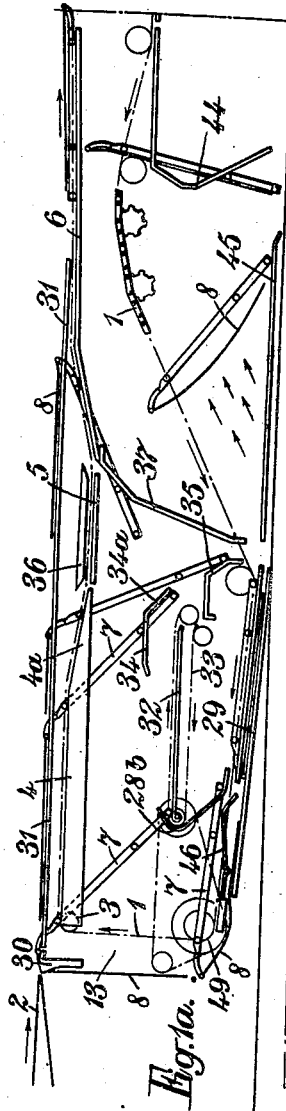
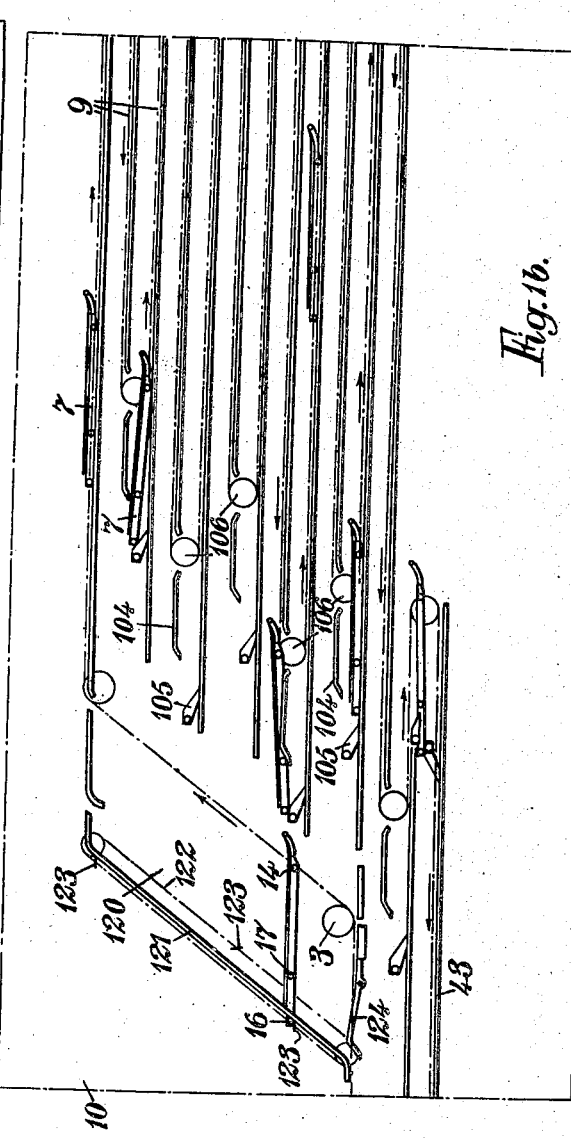
A. A. Tunley &
W. E. Prescott
Inventors
By: Glascock Downing & Seebold
Attys.

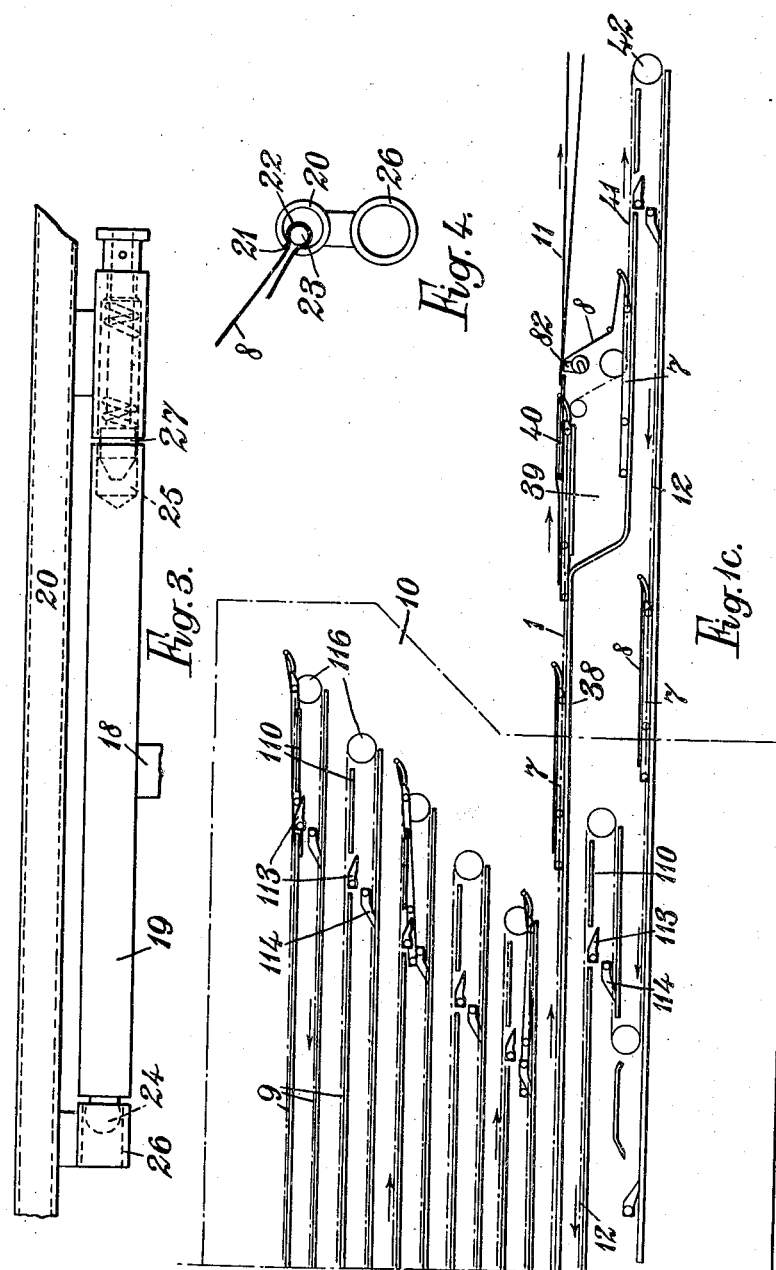

April 16, 1940.    A. A. TUNLEY ET AL    2,197,327
TRANSPORTING GOODS FROM A CHOCOLATE COATING OR LIKE MACHINE
Filed Aug. 17, 1938    12 Sheets-Sheet 3
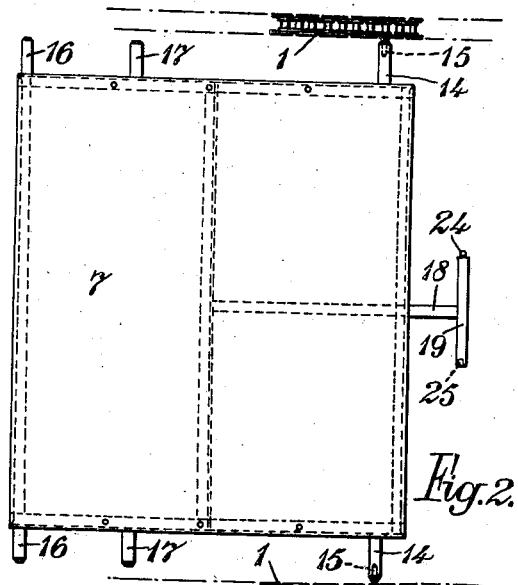
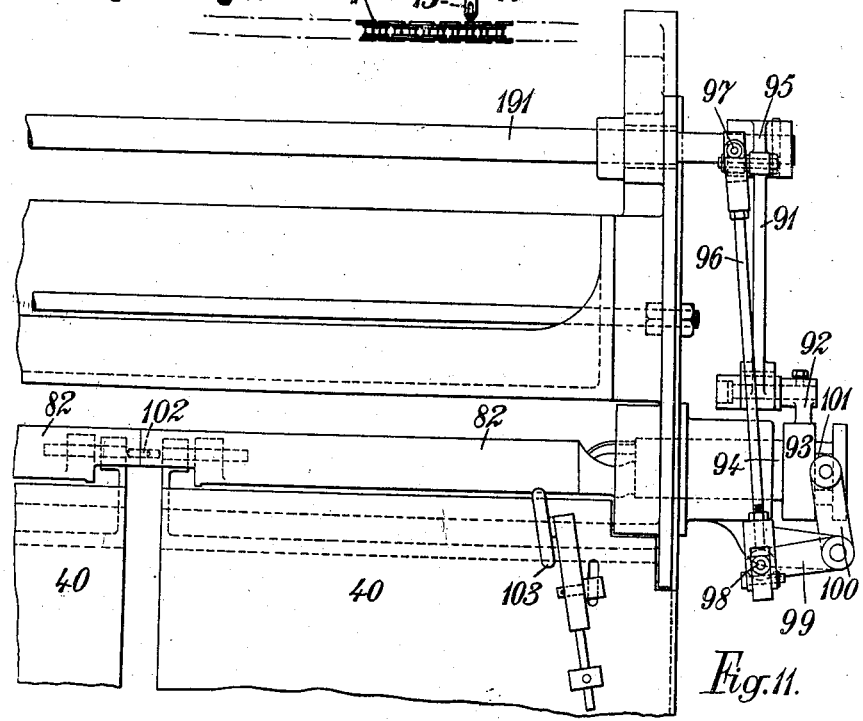

April 16, 1940. A. A. TUNLEY ET AL 2,197,327
TRANSPORTING GOODS FROM A CHOCOLATE COATING OR LIKE MACHINE
Filed Aug. 17, 1938 12 Sheets-Sheet 4
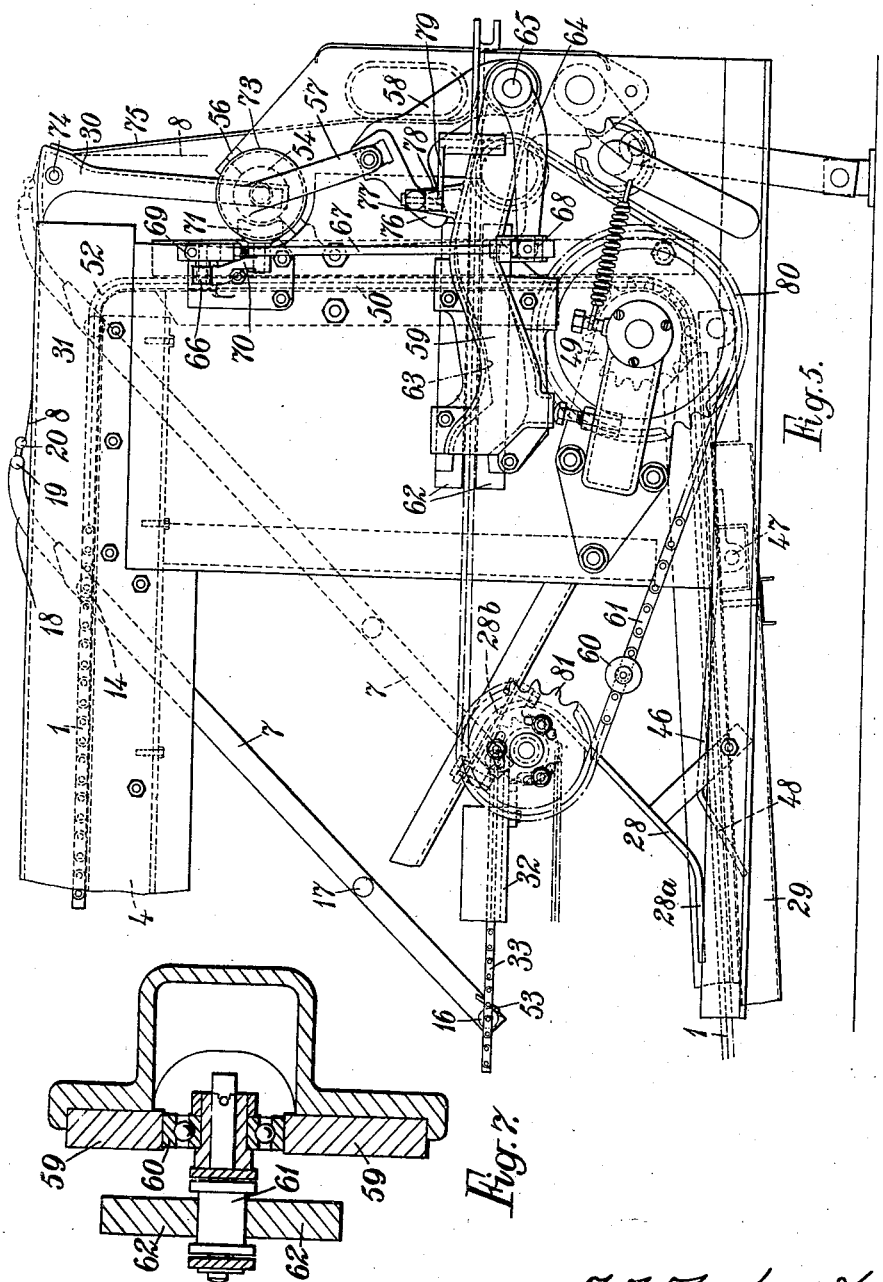

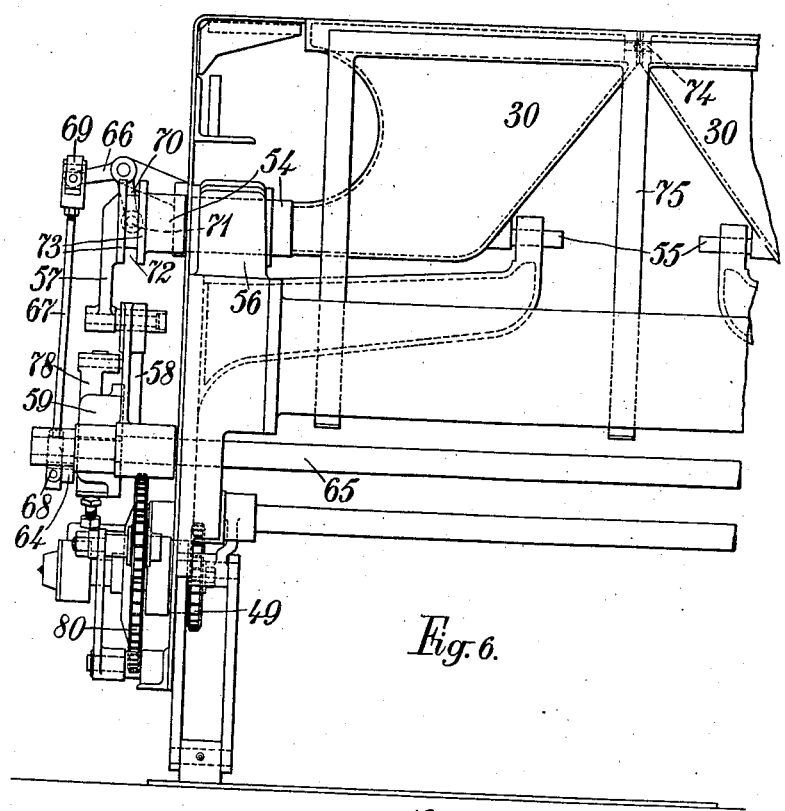
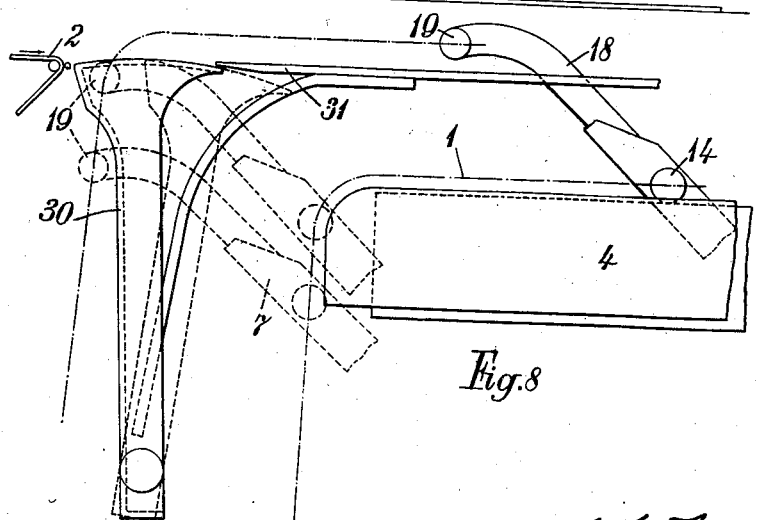

April 16, 1940.    A. A. TUNLEY ET AL    2,197,327
TRANSPORTING GOODS FROM A CHOCOLATE COATING OR LIKE MACHINE
Filed Aug. 17, 1938    12 Sheets-Sheet 6
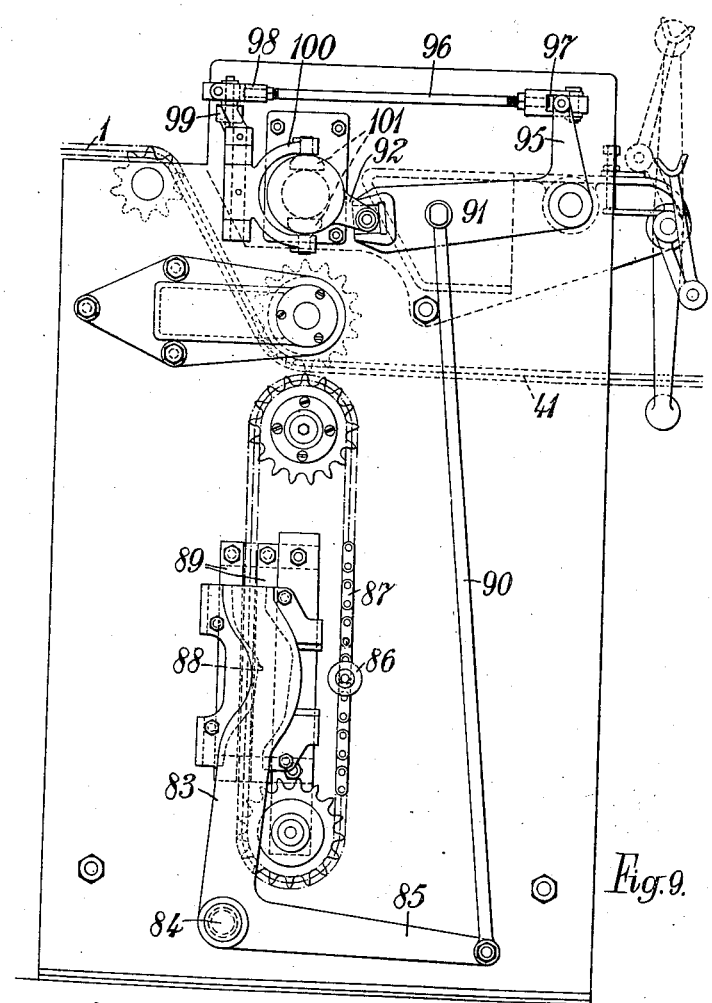
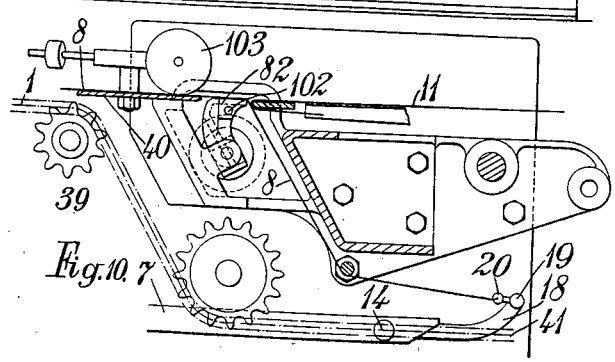
A. A. Tunley &
W. E. Prescott
Inventors

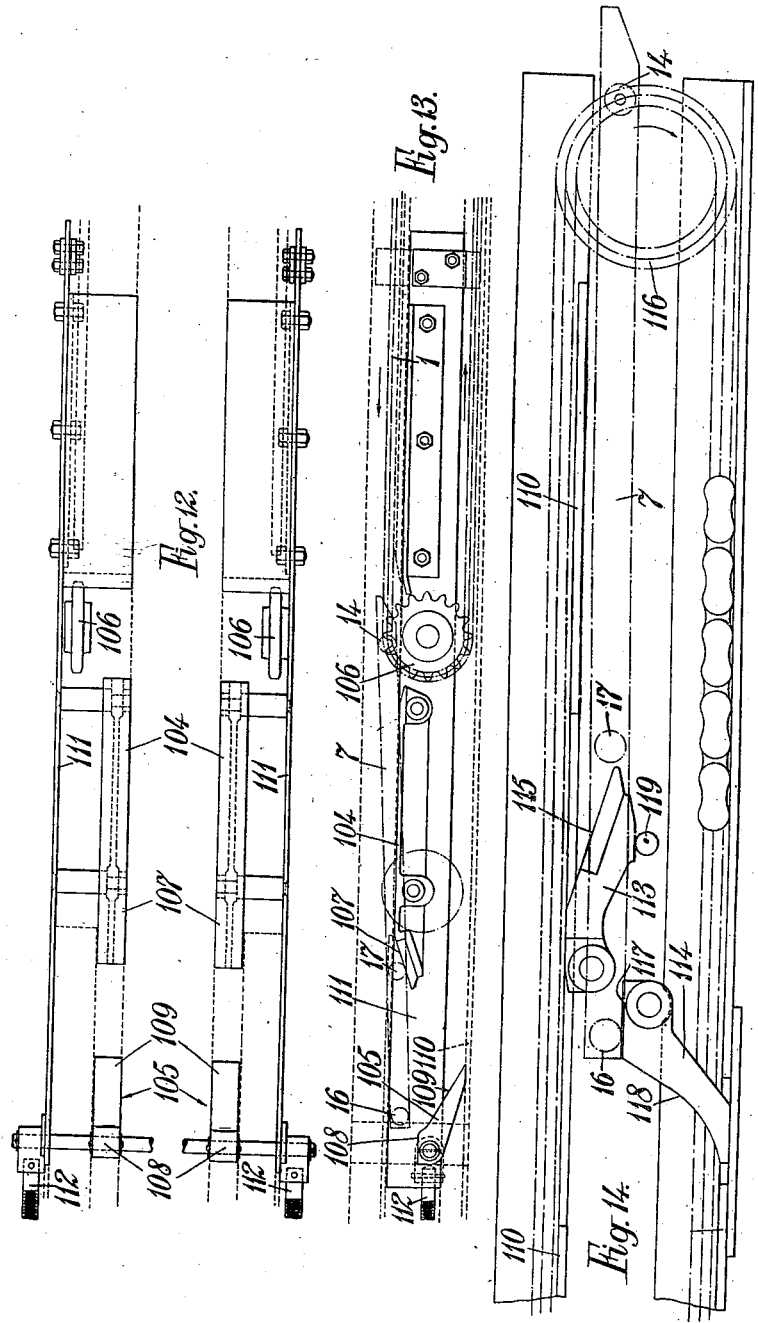

April 16, 1940.  A. A. TUNLEY ET AL  2,197,327
TRANSPORTING GOODS FROM A CHOCOLATE COATING OR LIKE MACHINE
Filed Aug. 17, 1938   12 Sheets-Sheet 8
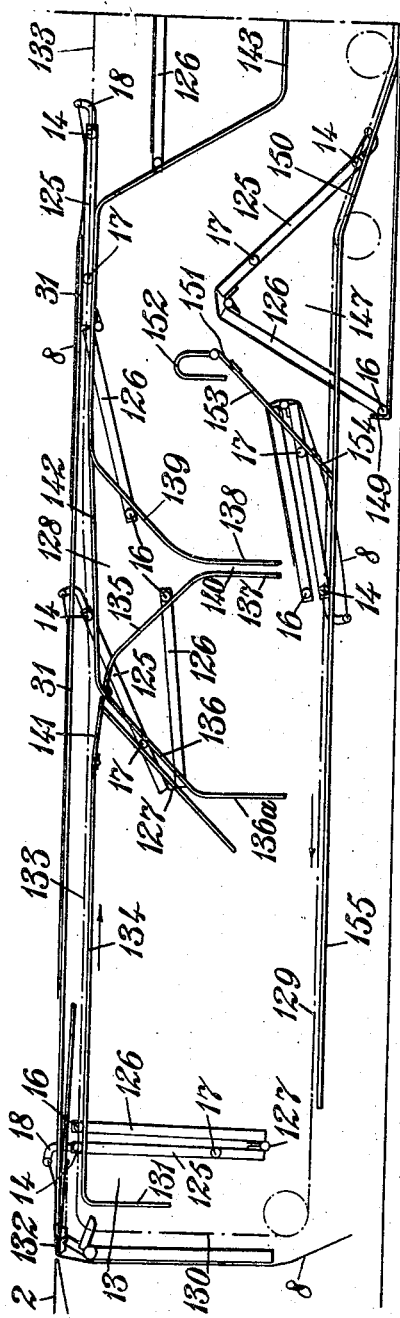
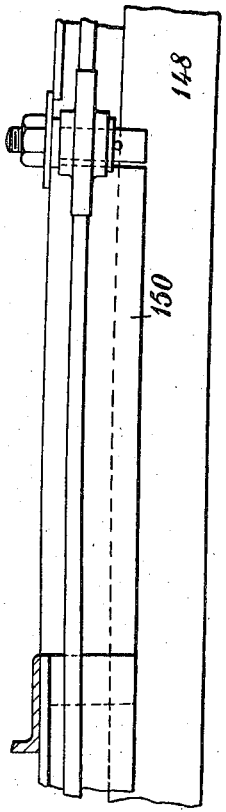
A. A. Tunley &
W. E. Prescott
Inventors

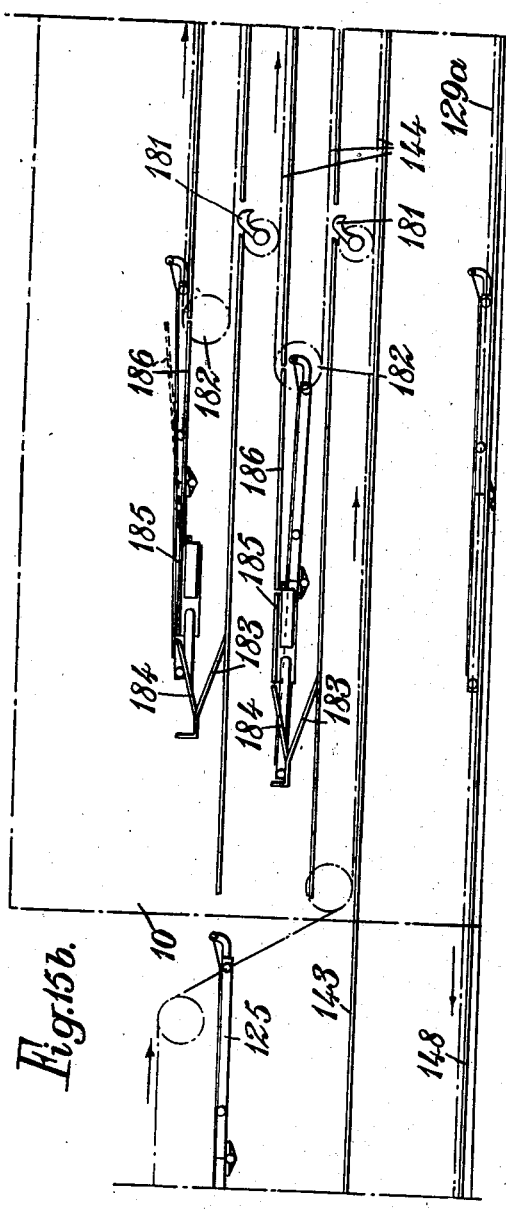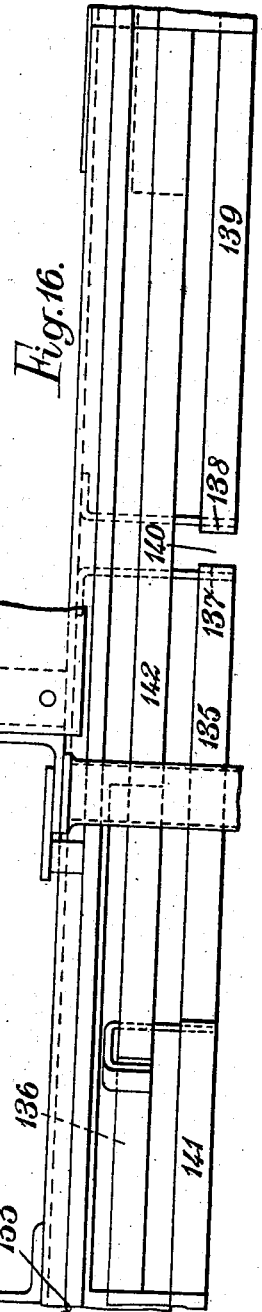

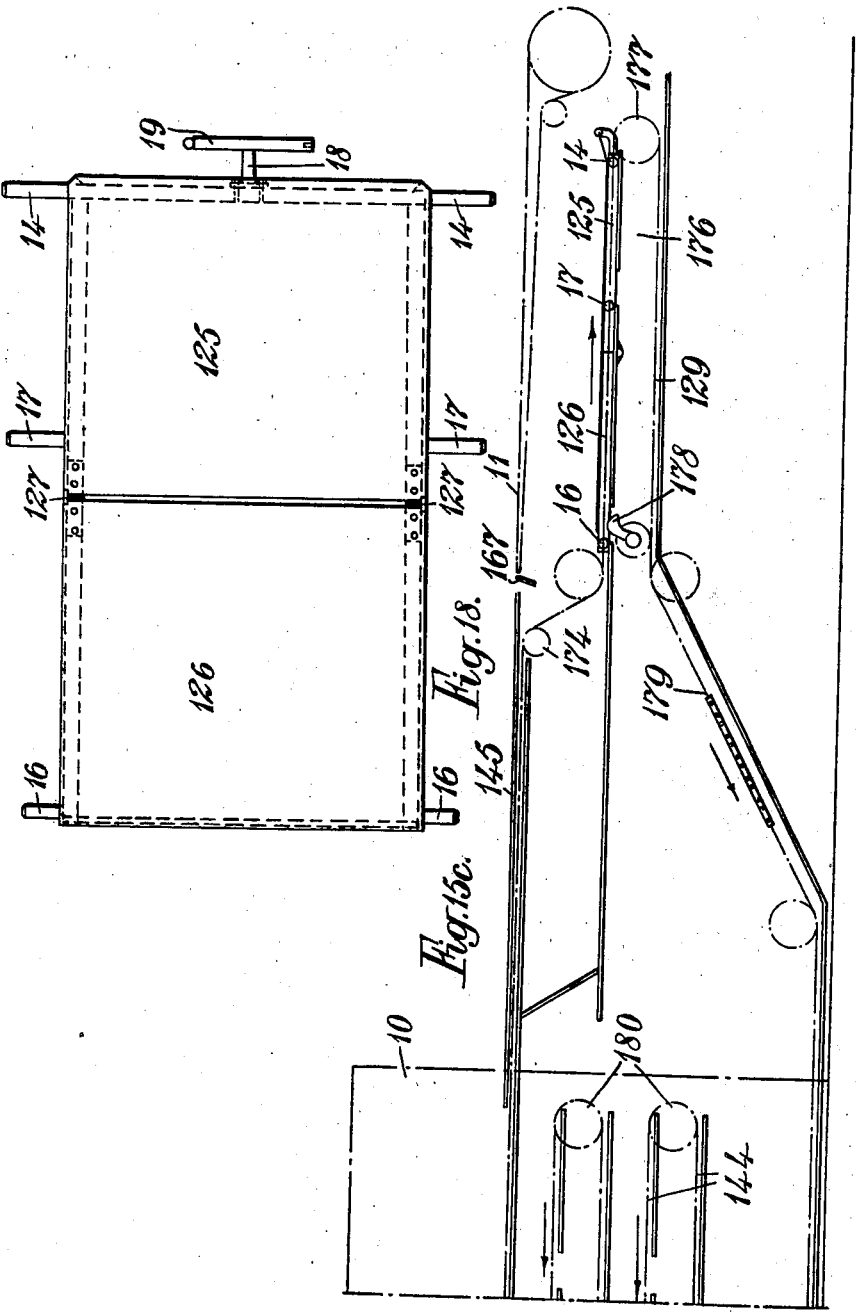

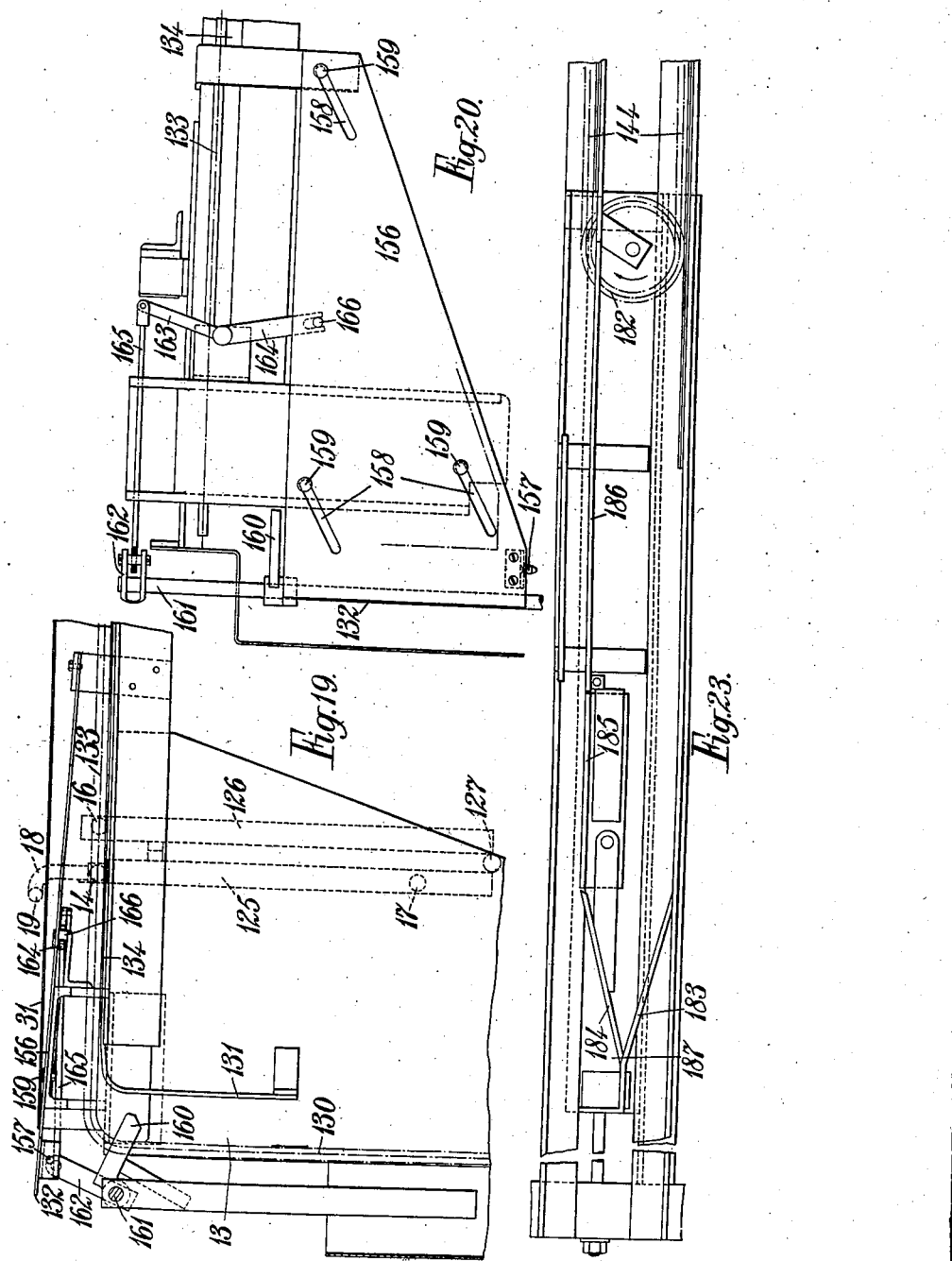

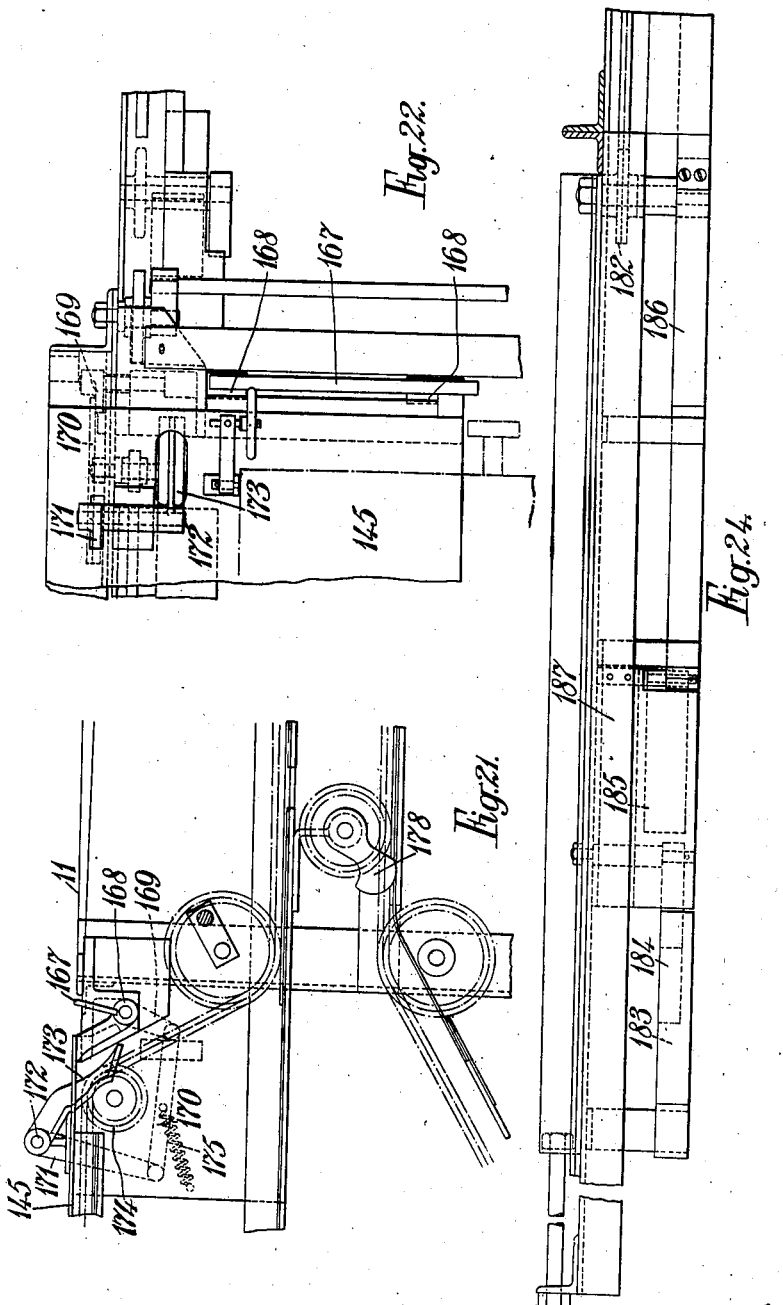

Patented Apr. 16, 1940

2,197,327

UNITED STATES PATENT OFFICE 2,197,327

TRANSPORTING GOODS FROM A CHOCOLATE COATING OR LIKE MACHINE

Allan Ashmead Tunley and William Edward Prescott, Peterborough, England, assignors to Baker Perkins Limited, Peterborough, England Application August 17, 1938, Serial No. 225,476
In Great Britain August 19, 1937

18 Claims. (Cl. 107—7)

This invention relates to machines or plant for transporting sweetmeats, biscuits or other goods from a chocolate coating or enrobing machine and has more particular reference to that type of plan wherein the goods are automatically delivered to paper sheets or plaques while the latter are progressively brought up over a knife edge adjacent the enrober delivery and subsequently conveyed through a cooling stage by an endless tray conveyor on the trays of which the plaques are supported, the goods after having passed through the cooling stage being delivered on to a receiving conveyor from the plaques as the latter are drawn downwardly over a discharging knife edge.

A plant of this kind is somewhat complicated and an aim of the present invention is to provide simplifications and improvements calculated to lower production costs, increase reliability of operation and a further object of the invention is to provide means facilitating alternative disposal of the treated goods such as for example delivering the goods from the plaques or enabling the loaded plaques to be removed for conditioning the goods or to supply the requirements of mixed goods packing.

It will be appreciated that although the invention is primarily concerned with chocolate coated goods it is also applicable to other confectionery or to other articles which require transportation to and from a setting, cooling or conditioning stage upon plaques or paper sheets. For convenience, however, the invention will be described hereinafter solely with regard to its application to chocolate coated goods.

According to the invention the trays of a tray conveyor each with an associated plaque are passed upwardly to a charging station where they receive coated goods while being drawn by the traction of the tray conveyor over a knife edge below which the trays pass.

The trays at the charging station may be suspended at a right or other convenient angle to their direction of travel, while the plaques are progressively drawn over the knife edge from a hanging position to a horizontal one.

According to a preferred form each plaque is attached by a plaque bar or the like to or over the head of its tray so that the head of the plaque is vertically spaced from the head of the tray with a view to permitting the intervention of a charging table between the plaque and its tray while the plaque is drawn over the table.

According to one form of the invention in which rigid one piece trays are employed, the trays during a part of the return circuit of the conveyor are turned over so that the plaque lies beneath, and are moved in this condition toward the charging or receiving station, the tray during charging being moved tail foremost at an inclined angle and when the plaque is loaded passing through a tray tilting stage whereby the tray is inverted to bring it top side uppermost for receiving the loaded plaque.

A further feature of the invention consists in folding the trays about a middle or other suitable transverse line so that the two parts of the tray lie back to back after the plaques have been unloaded and in unfolding them after they have passed the charging station. The trays may be raised to the charging station in a folded condition with the two leaves or halves disposed vertically and may be passed in this condition through the charging station under a charging table while the plaques are being loaded by drawing them over the table.

Further features of the invention will be described hereinafter and defined in the claims.

In the accompanying drawings which illustrate by way of example two modes of carrying the invention into effect:

Figures 1a, 1b and 1c together show diagrammatically an elevation of a plant according to one form, Figure 2 is a plan of a plaque carrying tray, Figures 3 and 4 are views showing a method of attaching a plaque to the tray, Figure 5 is an elevation of the feed end of the machine showing the mechanism by which the plaques are drawn over an oscillating head or knife edge device, Figure 6 is an end elevation corresponding to Figure 5, Figure 7 is a section of a detail of construction concerned with the feed end mechanism, Figure 8 is a diagram showing various positions of the oscillating head or knife device at the feed end, Figure 9 is an elevation of the delivery end of the machine showing means for controlling an oscillating delivery head or knife edge device over which the plaque is adapted to be drawn in discharging the goods, Figure 10 is a sectional elevation corresponding to Figure 9, Figure 11 is a partial plan of the delivery end of the apparatus, Figures 12 and 13 are plan and elevation of means for facilitating the movement of the trays at a turning point of the conveyor path and for adjusting the tension of the chain at such point, Figure 14 is an elevation of means for controlling the tray at a fixed turning point, Figures 15a, 15b and 15c together show diagrammatically in elevation a modified arrangement of the invention in which the supporting trays are formed of two parts hinged together, Figures 16 and 17 are plans of two sections of the plant showing the disposition of guiding rails or ramps, Figure 18 is a plan of the hinged type of tray, Figure 19 is an elevation and Figure 20 a half plan showing the means for controlling the knife edge at the charging or receiving station, Figure 21 is an elevation and Figure 22 a plan showing the means for controlling the knife edge at the discharge station, Figure 23 is an elevation and Figure 24 a plan of means for controlling the level of a tray as it passes from lap to lap in the cooling chamber.

In carrying the invention into effect according to one convenient mode as described by way of example and illustrated in Figures 1 to 14, a chain tray conveyor 1 (see particularly Figures 1a, 1b and 1c) is mounted in a suitable framework in longitudinal extension and in alignment with the wire conveyor delivery band 2 of an enrober or chocolate coating machine (not shown). Guide and turning point wheels 3 and chain track members or ramps are provided for guiding the conveyor and forming a length or run in which the conveyor 1 travels away from the enrober at an elevation lower than that of the plane in which the goods are delivered by the enrober wire band.

In addition track rails or plates 4, 5 and 6 are provided for supporting the trays by means of the trunnions referred to hereinafter.

Turning point and tray levelling means as hereinafter particularly referred to are also provided so that the trays 7 after the goods have been delivered on to their plaques 8 may pass through a series of superposed laps 9 located in a cooling chamber 10 or otherwise disposed for cooling purposes.

After passing through the laps of the cooling stage or chamber 10 the tray conveyor 1 passes below the level of a canvas or other receiving conveyor 11 on to which the chocolate goods carried by the plaques 8 are discharged and a return run or lap or laps 12 of the conveyor is provided so that each tray is returned and finally brought with its leading edge upwardly towards a charging or receiving station indicated generally by the reference 13 and which is located adjacent the delivery roller or knife edge of the enrober wire band conveyor 2.

It is to be noted that the trays indicated in the diagram of Figures 1a, 1b and 1c and also in certain other figures are not necessarily at their proper spacing on the conveyor chains but have been shown at suitable positions to indicate the movements they pass through during their passage from the receiving station 13, through the cooler 10, the discharging station indicated by the reference 39, and back to the receiving or feeding end of the circuit.

The trays 7 (see Figure 2) are rigid and are provided with pins or trunnions by which they are secured to the conveyor chains 1 and are supported or guided by track rails or plates. Each tray is provided with a pair of forward or head trunnions 14 which have apertures into which pins 15 carried by the conveyor chains 1 are seated.

In addition the trays are provided with a rear or tail pair of trunnions 16 and a pair of intermediate or mid trunnions 17. The tail and mid trunnions 16 and 17 are shorter than the head trunnions so that they may pass between the chains 1 as may be necessary during the passage of the trays around the circuit. The pins or trunnions 14, 16 and 17 may be provided with rail engaging anti-friction rollers if desired.

At the front of each tray a horn or upwardly directed arm 18 is provided on which a rod or plaque bar mounting 19 is carried. The mounting 19 is adapted to support a plaque rod or tube 20 (see Figure 3) in spaced relationship with the tray and at an elevation somewhat above the plane of the tray. The plaque bar or tube 20 may be secured to its plaque but preferably the tube is provided with a longitudinal slot 21 into which a loop 22 on the plaque is inserted, whereupon a bar 23 is passed through the loop so that the plaque 8 will be secured to its tube. The plaque bars or tubes 20 are preferably removably secured to the plaque bar mounting 19. This may be accomplished by providing the mounting at one end with a knob 24 while at the other end it is provided with a recess 25. The knob is adapted to seat within a short tube 26 secured to the plaque bar or tube 20 while a spring pressed bolt 27 carried by the bar or tube 20 is adapted to engage within the recess 25. By means of this attachment the plaque will be pivotally secured to the tray so that it may follow the desired relative movement therewith.

At the charging or receiving station 13 where the plaques are loaded with chocolates from the enrober conveyor 2 the tray head is moved vertically upward while its tail trunnions are elevated on to a cam track or guide rail 28 from a substantially horizontal position. The trays 7 arrive at said horizontal position inverted so that the plaque 8 lies beneath the plaques being suitably supported by a plate 29. The trays during their passage through the charging station are located at an angle of about 45°, this angle being maintained while the plaque 8 is drawn over the head or knife edge 30 and on to the supporting table 31. It will be appreciated that the table 31 is slotted longitudinally to accommodate the horns 18 of the trays so that the trays move beneath the table 31 while the plaques are drawn over and supported by the table.

During the movement of the trays while the plaques are being loaded, the trays are supported at the angle referred to by the tail trunnions 16 seating on a guide rail 32 and so that the trays move forwardly tail foremost. The movement of the trunnions 16 along the rail 32 is positively effected by an endless conveyor device 33 having trunnion engaging elements as hereinafter more particularly referred to.

As the tail trunnions 16 approach the end of the guide rail 32 the mid trunnions engage an upper guide rail 34 having a downwardly inclined portion 34a down which the mid trunnions 17 move, whereby the trays are brought toward the vertical. During this movement the trays are supported by their head trunnions 14 engaging a downwardly inclined portion 4a of the track member 4.

As the mid trunnions 17 run off the inclined portion 34a the tail trunnion 16 engages a guide rail 35. The head trunnions 14 then pass beneath an inverted chain track 36, located above the track rail 5 whereby the trays are brought to a vertical position.

During the next portion of its movement the tray is inverted by its tail trunnions 16 and then the mid trunnions 17 engaging a guide rail 37 which leads up to the track rail 6 so that finally the trays become inverted to occupy their normal position with their top sides uppermost, ready for supporting the plaques. As the trays move on to the track rail 6 the plaques are drawn off the supporting table 31 so that they become supported entirely by the trays.

At this point the trays with the plaques carrying the goods enter a cooling chamber 10 and are immediately elevated to the uppermost of the superposed runs 9. After passing through the various runs of the conveyor in the cooling chamber the trays emerge along a run 38 to the discharging station indicated generally by the reference 39 where the plaques pass over a table or plate 40 while the tray is located beneath such table. The trays pass downwardy beneath the level of the receiving conveyor 11 on to a lap 41 in which the empty plaques are supported by the trays.

The trays are then brought to the return lap (or laps) 12 by the conveyor 1 passing around direction changing wheels 42 and then passed backwardly beneath the cooling chamber to a lap 43. The trays move along the return laps tail end foremost.

At the end of the lap 43 a tray inverting track or ramp 44 is provided which is adapted to be engaged by the mid trunnions 17 so that the tray is brought to a vertical position, the path of the conveyor 1 at this point being elevated to permit of this movement. The tail trunnions 16 next engage a track or ramp 45 by which they are turned anti-clockwise as seen in Figure 1a so that the plaque is brought beneath the tray. In order to support the plaque a blast of air may be utilised at this point as indicated by the arrows.

The course of the conveyor now moves downwardly so that the tray and plaque are completely turned over and brought to a position where the plaques are supported by the plate 29. From this position the trays proceed again to the charging station 13.

Turning now to Figures 5 to 8 which illustrate the means for accommodating the plaques and trays at the feeding end, it will be noted that Figure 5 is shown in the reversed position from Figure 1a. This is due to the fact that the mechanism shown in Figure 5 is on the reverse side of the machine from that indicated in Figure 1a.

As a tray with the plaque located beneath approaches the feeding station, the plaque being supported by the plate 29, it passes a switch rail or device 46 which is pivoted at 47 and is weighted to maintain it in the position indicated in Figure 5. This switch is provided with an inclined portion 48 adapted to be engaged by the head trunnions 14 and mid trunnions 17 of each tray. As the tray moves toward the switch, i. e., to the right as shown in Figure 5, the part 48 is first engaged by the head trunnions 14 and moved downwardy out of the way so that these trunnions may pass. Thereafter the mid trunnions 17 engage the inclined part 48, but owing to the fact that the head trunnions 14 still engage the forward end of the switch device 46 the latter cannot pivot and in consequence the mid trunnions 17 move up the inclined portion 48 whereby the tail trunnions 16 are elevated so as to move on to the lower substantially horizontal end 28a of the guide rail 28.

The head trunnions 14 then pass around the conveyor guide wheel 49 and up the substantially vertical part 50 of its path, the tail trunnions 16 during this movement being dragged up the inclined part of the guide rail 28. When the head trunnions 14 reach the upper end of the vertical path 50 the tail trunnions 16 arrive at a curved part 28b of the guide rail 28. This portion 28b is curved to correspond with the curvature of the upper turning point 52 of the conveyor so that as the head trunnions 14 pass around such portion 52 the tail trunnions 16 move around the portion 28b so that the tray during this movement is maintained parallel to itself. The tail trunnions 16 are positively moved around the curved portion 28b by means of the endless chain 33 hereinbefore referred to, which is provided with trunnion engaging slats or dogs 53.

From this point the tray moves substantially parallel to itself tail foremost, the tail trunnions being supported by the track 32 (see Figure 1a). During the whole of their movement along the track 32 the tail trunnions are positively driven by the dogs 53 on the chains 33.

It will be appreciated that the plaque 8 when receiving goods from the enrober conveyor 2 has to be brought close to such conveyor and as the plaque bar mounting 19 has to be elevated above the table 31 it is necessary that the knife edge or head 30 over which the plaque 8 is drawn is movable out of the way to allow the passage of the mounting 19. For this purpose the head 30 is adapted to oscillate away from the enrober for which purpose it is mounted by trunnions 54, 55 in a suitable bracket 56 secured to the framing of the machine. The trunnions 54, 55 are duplicated as the head 30 is made in two parts as hereinafter described. The trunnion 54 is provided with an arm 57 having a sliding engagement with a rocking arm 58 which is free to pivot on the shaft 65 but is normally secured to a pivoted cam lever 59 so as to rock therewith. This cam lever 59 is adapted to be moved about its pivot by a travelling roller 60 which is mounted upon an endless chain 61 (see Figure 5). The chain is constrained to move along a horizontal path while actuating the lever 59 by a pair of guide plates 62 so that as the roller 60 passes through the cam track 63 of the lever 59 the latter will be oscillated in the desired manner to move the knife edge or head 30 out of the path of the plaque mounting 19.

In addition to this oscillation of the knife edge or head it is necessary so to manipulate it that the horn 18 may pass and therefore the head is made in two parts which separate laterally to provide a passage for the horn. The lateral movement of each part of the head is obtained through the agency of the cam lever 59 by means of levers 64 secured to the ends of the spindle 65 upon which the cam lever 59 is keyed.

Each lever 64 is coupled to a bell crank lever 66 by means of a rod 67 and universal couplings 68 and 69. The other arm 70 of the bell crank lever is pivotally connected to a shoe 71 engaging within the recess 72 between collars 73 on the trunnion 54 of the head.

The two parts of the head are provided with a pin and hole connection 74 whereby the surface of the head over which the plaque is adapted to be drawn is properly aligned when the parts are again brought together. The plaques are held in proper contact with the head by means of spring plates 75.

Should it be necessary, for example, in the event of a plaque becoming crumpled, to oscillate the head 30 independently of the cam lever 59 the latter is coupled to the arm 58 by a readily detachable means. Thus the arm 58 is provided with an extension 76 adapted to be engaged by a bolt 77 which is carried in an extension 78 of the cam lever 59. The bolt is controlled by a pivoted lever 79 so that it may be withdrawn to release the coupling.

The chain 61 carrying the roller 60 is driven from a sprocket wheel 80 which derives its motion from the conveyor chain 1. The chain 61 is adapted to drive the chain 33 carrying the dogs 53 by means of a sprocket 81 whereby the various moving parts are synchronised and driven at the appropriate rates.

From the diagram Figure 8 the movements of the head 30 and a tray will be appreciated, it being observed that the head 30 is shown in its extreme positions first in full lines for the normal working position, and in dotted lines where it is fully drawn back to allow the passage of the mounting 19.

It will also be appreciated that each tray 7 in moving into the charging position is retained to the rear of the oscillating head 30 while its plaque 8 is located outwardly of the head, the horn 18 during such movement being accommodated in the space between the parts of the head.

Turning now to Figures 9, 10 and 11, which show the mechanism for controlling the trays and plaques as they move through the discharging position, it will be appreciated that after leaving the cooling chamber the plaques 8 and trays 7 proceed on the opposite side of a table 40 so that they may become separated to allow plaques to be drawn downwardly adjacent the receiving conveyor 11 on to which the goods are discharged.

During this discharge the plaques 8 are moved over an oscillating head 82 which is arranged in a somewhat similar manner to the oscillating head 30 at the receiving station, the trays being moved downwardly and preferably being maintained in a horizontal position so that finally the empty plaque 8 will again be supported by the tray for return along the return lap (or laps) 12 hereinbefore referred to. The oscillating head 82 is divided so that the parts may be laterally separated to open and allow the passage of the horn 18 of the tray. In addition the head 82 is adapted to be oscillated away from the receiving conveyor 11 to permit the passage of the plaque mounting 19. These movements are effected by somewhat similar means to those used for moving the oscillating head 30.

Thus, referring to Figure 9, a cam lever 83 pivoted at 84 is provided with an arm 85. This cam lever is adapted to be oscillated by a roller 86 mounted upon an endless chain 87 and adapted to engage in the cam track 88 of the lever, the chain being restrained to move in a rectilinear path while contacting with the cam track 88 by the guide plates 89. The arm 85 of the cam lever 83 is connected by a link 90 to one arm 91 of a bell crank lever which is secured upon a rock shaft 191. This arm of the lever has a sliding connection with an arm 92 of a sleeve 93 which is fixed upon a trunnion 94 of the oscillating head 82 whereby the latter is oscillated through the movements of the cam lever 83. The other arm 95 of the bell crank lever is coupled by a link 96 and universal joints 97, 98 to a lever 99 secured to a rocking bifurcated arm 100 which is provided with shoes 101 engaging a recess in the sleeve 93 whereby the associated part of the oscillating head 82 may be moved laterally to allow the horn 18 of a tray 7 to pass.

Similar means are provided at the other end of the rock shaft 191 for oscillating and laterally moving the other part of the head 82.

The parts of the discharging head 82 are provided with a pin and hole arrangement 102 for keeping them in alignment when closed.

In order to hold down the plaques while they are being drawn across the oscillating head 82 and avoid their ends flipping up, weighted rollers 103 are provided located in a position to engage the plaques near their marginal edges.

Referring now to Figures 12 and 13, means are provided at certain of the turning points of the laps of the conveyor 1 located within the cooling chamber 10 for adjusting the tension of the conveyor 1, these tensioning means preferably being associated with means for maintaining the trays level or substantially level as they pass around the turning points. The tray levelling means comprise pivoted switch members 104 and 105 adapted to be engaged respectively by the mid trunnions 17 and tail trunnions 16, while the head trunnions 14 move around the direction changing sprocket 106.

As the tray passes to the left as shown in Figure 13 the mid trunnions 17 move along the horizontal portion of the switch members 104 so that the tray is maintained level.

Just prior to the head trunnion 14 passing downwardly around the sprocket 106 the mid trunnions 17 run down short inclined portions 107 of the switches 104 so that the tail trunnions 16 are lowered on to horizontal surfaces 108 of the switches 105. When the head trunnions reach the horizontal plane containing the axis of the turning sprocket 106 the mid trunnions 17 are off the inclined parts 107 so that they will miss such part as the head trunnions move downwardly below said horizontal plane.

During the continued movement of the head trunnions 14, the tray now moving in a reverse direction, i. e., to the right as seen in Figure 13, the tail trunnions will move down the inclined surfaces 109 of the switches 105 and on to the track rails 110. The sprockets 106 and switches 104 and 105 are all secured upon plate members 111 which are adjustable for tensioning the conveyor chains 1 by means of screws 112.

At the fixed turning points for the conveyor 1, i. e. those shown at the right hand end of the cooling chamber, tray levelling means are provided as shown in detail in Figure 14. These means comprise pivoted switches 113, 114 adapted for engagement respectively by the mid trunnions 17 and tail trunnions 16 of the trays. The rails 110 supporting the trunnions are cut away adjacent the switches 113, 114 to allow the trunnions to pass through.

While the head trunnion 14 passes around the first quarter of the circular track of the direction changing sprocket 116 the mid trunnion 17 passes down the inclined surface 115 of the switch 113. When the head trunnion 14 is on the horizontal plane of the axis of the direction changing sprocket 116, the tail trunnion 16 engages the surface 117 of the switch 114 while the mid trunnion 17 leaves the surface 115 of the switch 113. Thereafter as the head trunnion moves downwardly from said plane and the direction of the tray is reversed the tail trunnion 16 will run down the curved track 118 of the switch 114 and finally on to the lower rail 110.

In order that the mid trunnions shall avoid the switches 113 during this movement the latter may rise on their pivots moving away from their supports 119. The switches 114 will rise out of the way of the mid trunnions 17 and the head trunnions 14 as the tray moves to the left in Figure 14.

When the loaded plaques supported by their trays enter the cooling chamber they move upwardly along an inclined path as shown in Figure 1b and indicated generally by the reference 120.

In order to maintain the trays level while moving up this inclined path the tail trunnions 16 engage rails 121 and if desired may be positively moved along such rails by an endless chain 122 provided with driving dogs 123 similar to the chain 33 and dogs 53 shown in Figures 1a and 5. A pivotally weighted switch 124 is provided at the commencement of this inclined upward movement, such switch being similar to the switch 46 (see Figure 5) and being for the purpose of lifting the tail trunnions 16 on to the lower end of the rail 121. This is effected by the mid trunnions riding up the inclined entry portion of the switch 124 while the switch is being held by the head trunnions 14.

The loaded trays then pass into the cooling chamber 10 and up the inclined path 120. As the trays enter this path they come under the influence of the switches 124 which by the engagement of the mid trunnions 17 raise the rear trunnions 16 on to the lower end of the track 121.

The loaded trays then pass through the various runs 9 within the cooling chamber and finally emerge from the chamber on to the section 38 where the trays move beneath the slotted table 40 while the loaded plaques move above the table.

Adjacent the end of the table the plaques are drawn over the oscillating discharge head 82 which is oscillated away from the receiving conveyor 11 to allow the passage of the plaque mountings 19 while the parts of the head open laterally to permit the passage of the horn 18.

After the plaques have discharged their goods on to the receiving conveyor 11 the plaques are again brought on to the trays as they pass along the section 41. From this position the trays pass around the direction changing end associated with the sprocket 42 and return along the return lap (or laps) 12 located at the bottom of the cooling chamber, finally passing along the section 43.

During this return movement the trays travel rear end foremost.

After passing through the section 43 the mid trunnions 17 run down the track 44 while the head trunnions 14 are lifted by the conveyor chains taking an upward path at this point.

By the raising of the head trunnions and the engagement of the mid trunnions with the track 44 the trays are suspended vertically. This position is retained until the rear trunnions 16 engage with the track 45, at which position the conveyor chains 1 move sharply downward so that the trays are inverted to bring the plaques beneath the tray. Continued movement brings the tray into the more or less horizontal position where it again approaches the charging station.

According to an alternative mode of conveying the trays from the delivery station to the charging station the trays may be lowered as previously described, while the plaques are drawn over the delivery knife edge and restored to the surface of the tray. The tray is then pushed or conveyed tail foremost to a position under the wire enrober band where the tray head is guided around a turning point and elevated until the tray hangs vertically or somewhat inclined with its tail towards the enrober. After the plaque bar has passed through the knife edge gap it is drawn horizontally over the charging table by the tray conveyor movement while the tray hanging in the vertical or inclined position from its head trunnion is passed beneath the table. As the tray proceeds the tail trunnions meet an inclined rail or cam which elevates the tail gradually to a position approximating the horizontal, when it is then protruded under the end of the charging table and travels forward horizontally while the loaded plaque is progressively laid upon it. After the tray has received its load it moves on to the first turning point into the cooling chamber and proceeds as already described.

According to a further modification by means of which longer trays and plaques may be used while still applying the apparatus to an enrober machine of the normal height, the trays (see Figure 18) are formed in two parts 125, 126, foldable about a transverse hinge 127. The forward part of the tray 125 carries the head trunnions 14 (which are connected to the chain conveyors) and the mid trunnions 17, while the tail portion 126 of the tray carries the tail trunnions 16.

It will be noted that the trunnions are of three different lengths, the head trunnions being the longest while the tail trunnions are the shortest.

Means are provided in the return lap of the conveyor circuit for folding up the trays so that they approach the receiving station 13 with the tail portion uppermost. On the outward run of the conveyor from the receiving station the trays pass through an unfolding station 128 in which the tail portion 126 moves away from the head portion 125 and is pivoted about the hinge 127 and brought up into alignment with the head portion prior to the trays passing beyond the table 31 on which the plaques 8 are supported during the unfolding of the trays. The forward portion 125 of each tray is provided with an upwardly directed horn 18 which carries a mounting 19 to which the plaque 8 is detachably connected in any suitable manner, as for example in accordance with the arrangement described in the first modification.

The hinging of the parts of the tray is such that they will be retained in alignment when extended and right side uppermost, and supported only by the head and tail trunnions 14 and 16.

Referring particularly to Figures 15a, 15b and 15c in which the track of the conveyor chains is indicated by a dot and dash line throughout, the trays are elevated from the end of the return run 129 of the circuit and move up a vertical run 130 while in the folded condition, the unfolding of the parts of the tray being prevented by the engagement of the tail trunnions 16 with downwardly directed guard rails 131.

At the receiving station 13 the plaques 8 are drawn over a reciprocating knife edge 132 associated with the table 31.

At the same time the trays pass beneath the table, the latter being provided with a longitudinal slot to accommodate the horns 18 of the trays.

From the vertical run of the conveyor the trays pass along a horizontal run 133 with which a track 134 is associated for supporting the head and tail trunnions 14 and 16. This straight portion of the conveyor run extends into and beyond the tray unfolding station 128. As the trays approach this unfolding station the tail trunnions 16 are adapted to move down a curved trunnion-supporting track 135 while the head trunnions 14 conform to the run 133 of the chain.

It may be pointed out here that the chain is provided with a supporting rail which is not shown in the drawings as it would be confused with the trunnion-supporting tracks so that as the tail trunnions 16 move on to the track 135 the head trunnions are supported solely by the rail track by the engagement of the chain therewith.

Just prior to the tail trunnion 16 moving down the track 135, the mid trunnion 17 engages the vertical part 136a of a track 136 which causes the forward part 125 of the tray to become inclined.

As the tail trunnions 16 move down the track 135 the rear part of the tray falls away and the mid trunnions 17 during this falling away are guided on the upwardly inclined track 136. This movement continues until the tail trunnions 16 finally arrive in a slot 140 formed between a vertical portion 137 of the track 135 and a similar opposed portion 138 of a guide track 139. As the trunnion 16 enters this slot 140 the mid trunnions 17 moving upwardly along the track 136 pass through a pivoted gate 141 and on to a horizontal track 142 which is located at a slightly lower elevation than the chain conveyor rail.

As the front portion 125 of the tray assumes a substantially horizontal position the rear portion 126 by the location of its tail trunnion 16 in the slot 140 is caused to become inverted and by the continued movement of the front part along the horizontal track 133 of the conveyor the rear portion is drawn upwardly with its tail trunnion guided by the track 139. The track 139 finally merges into the same plane as the track 142 so that the rear part 126 of the tray is brought into alignment with the front part 125 of the tray as the latter moves from beneath the end of the table 31.

The inverted tray now supporting the loaded plaque then moves downwardly, suitable means being provided to maintain the tray horizontal, until it arrives on the lower run 143 when it passes into the cooling chamber 10. In the cooling chamber the trays pass upwardly through a series of superposed laps 144 with which tray levelling and direction turning wheels are provided which will be more particularly referred to hereinafter. The trays emerge from the cooling chamber at the highest lap, the trays then passing beneath a table 145 while the plaques pass above and are supported by the table.

The trays at this point move downwardly beneath the level of a discharge band 11 where the goods are transferred from the plaques to the conveyor 11, the plaques passing over a suitable knife edge 146, so that the unloaded plaques are again supported by the trays. From this discharging position the trays move downwardly on to the commencement of the return run 129 of the conveyor from which they travel rear end foremost to the low level 129a of the return run. From this low level the trays enter a folding station indicated generally by the reference 147 where they are again folded and pass to the receiving station 13.

For the purpose of folding the trays the tail trunnions 16 move along the rail 148 and finally abut against a stop 149 while at the same time the mid trunnions 17 and head trunnions 14 pass along a rising rail 150 whereby the parts 126 and 125 of the tray are brought to an angled position as seen in Figure 15a. This angled position continues until the trunnions 17 engage with and pass by a pivoted switch 151 and into an inverted U-shaped track 152.

The continued movement of the front portion 125 of the tray causes the parts to move into a vertical position, the trunnion 16 moving upwardly away from the stop. Then by the pivotal action caused through the engagement of the trunnions 17 in the inverted U-shaped track 152 the now folded tray is caused to pivot over about the head trunnions 14 so that the mid trunnions 17 will run down the inclined track 153, the pivoted switch 151 in the meantime having closed.

It will be noted that at the lower end of the track 153 a pivoted switch 154 is provided which allows the passage of the tail and head trunnions 16 and 14.

The folded tray finally occupies the horizontal position corresponding to the run of the conveyor 129 in which the trunnions 14 and 17 are supported by the rail 155. From this horizontal portion the folded trays again enter into the receiving station 13.

When the trays are folded the plaques may also fold or they may trail behind the folded trays, being supported by a suitable plate located beneath the run 129.

It will be remembered that the trunnions on each side of the tray are of different lengths, the mid trunnions 17 and tail trunnions 16 being shorter than the head trunnions 14 so that at the appropriate point the tray whether in folded or unfolded condition may swing downwardly between the conveyor chains and the tracks therefor.

Moreover at the unfolding position 128 and the folding position 147 the various tracks which engage the mid and tail trunnions are located laterally relatively to the conveyor chain rails and to one another so that only those parts of the tracks will be engaged by the trunnions which are appropriate to move the parts of the tray in the desired positions.

This disposition of the tracks will be followed from the plan views in Figures 16 and 17. Again in some places, for example where the tray moves rear end foremost on the return section 48 (Figures 15a and 15b) all trunnions are engaged by a common guide plate 148. Similarly a full width guide plate is provided where the parts of the tray move into alignment and emerge from beneath the table 31.

Referring now to Figures 19 and 20 which illustrate the means for causing a reciprocation of the knife edge 132 at the receiving station 13, this knife edge is formed by two plates 156 adapted to be moved laterally to admit the passage of the horn 18 of the tray, each plate 156 being of substantially triangular shape. The plates are provided adjacent their inner co-operating faces respectively with a dowel 157 and a co-operating aperture to maintain the two parts of the knife edge in alignment when they are closed together.

The plates 156 lie in an inclined position beneath the table 31 so that their forward edges comprising the knife edge 132 project beyond the table and lie substantially in alignment with the upper surface thereof. The plates are provided with a plurality of slots 158 which are engaged by stationary pins 159 mounted upon the framing of the machine. The slots 158 are inclined with regard to the longitudinal axis of the machine so that on a rearward movement of the plates 156 a lateral movement will also be imparted thereto. The movement of the plates is adapted to be effected by the passage of the tray as it moves upwardly in the receiving station.

For this purpose an arm 160 is mounted upon a spindle 161 and lies in the path of the leading edges of the trays. As the edge of an upwardly moving tray engages the arm 160 it pivots the spindle 161 and through an arm 162 secured thereon pivots a bell crank lever 163, 164 to the arm 163 of which it is connected by an adjustable rod 165. The arm 164 of the bell crank lever is slotted and engages a pin 166 secured to the plate 156.

By this arrangement as a tray moves upwardly and strikes the arm 160 the bell crank lever is moved counter-clockwise as seen in Figure 20 and causes the plate 156 to recede and move laterally to allow the passage of the mounting 19 and horn piece 18 of the tray whereby the plaque will be drawn over the knife edge 132 and on to the table 31 while the tray will move with the conveyor below the table.

Referring to Figures 21 and 22, after the trays with the loaded plaques pass from the cooling chamber 10 they move along a horizontal path where the plaques move above and are supported by a table 145, the tray proceeding beneath the table until they reach the discharging point where the plaque is adapted to be drawn over a delivery knife edge 167 which is located within the gap between the table 145 and the receiving conveyor 11. The delivery knife edge 167 is formed in two parts laterally spaced at the centre line of the machine to allow of the passage of the horn 18 of the tray.

In order to permit the plaque mounting 19 to pass through the gap the knife edge 167 is pivotally mounted and adapted to be moved away from the receiving conveyor 11.

For this purpose each part of the knife edge 167 is supported by a pivotal mounting 168 which carries an arm 169. The arm 169 is connected by a link 170 which in turn is connected to a lever 171 mounted upon a spindle 172. The spindle 172 carries an arm 173 located in the path of a leading trunnion of the trays as they move around the direction changing wheel 174, the arrangement being such that on the trunnion striking the arm 173 the knife edge is pivoted rearwardly across the opening to allow the passage of the plaque mounting 19. The parts are returned by a tension spring 175 connected to the link 170.

During the discharge of the goods from the plaque on to the receiving conveyor 11 the tray moves downwardly parallel to itself and arrives at the direction changing position 176 where the head trunnions 14 pass around the direction changing sprocket 177 while the mid trunnions 17 and tail trunnions 16 pass through gaps in the supporting track. As the head trunnions 14 move around the sprocket 177 the tail trunnions 16 are supported upon rotating arms 178 which are geared to the conveyor chains. By this means the tray moves downwardly while maintaining its horizontal position and arrives on the horizontal part of the return track 129 along which it proceeds tail foremost down the inclined run 179 and on to the part 129a of the return run.

Referring now to Figures 23 and 24 it will be remembered that the trays in their passage through the cooler 10 move upwardly over the superposed laps of the conveyor. Along certain of these laps the tray moves head foremost while on the intermediate laps the tray moves tail foremost. As the tray is about to change from a head foremost travel to a tail foremost the head trunnions 14 pass around direction changing wheels 180 while the tail trunnions 16 are lifted by rotating arms 181 which are geared to the conveyor chains to rotate in the same direction as the direction changing wheels 180.

The trays are thus lifted while being maintained horizontal so that they become supported on the intermediate runs where their movement is in the reverse direction, that is tail foremost.

At the end of these runs lifting means are provided for the tail trunnions while the head trunnions move around direction changing wheels 182. The lifting means are shown in Figures 23 and 24 and comprise inclined track portions 183 for the tail trunnions which are associated with pivoted switches 184 adapted to lift the tail trunnions on to rails 185 at the level of the next run of the conveyor.

Intermediate the direction changing wheels 182 and the incline 183 and switch 184, a pivoted balanced part of the rail 186 is provided which is adapted to rise and permit the head trunnions 14 and mid trunnions 17 to pass from the lower to the upper level, the movable rail 186 thereafter moving back to its position by the tail trunnions to act as a support for the tail trunnions as the trays move along the upper run. The inclined rail 183, switch 184 and pivoted rail portion 186 together with the direction changing wheel 182 are carried by a movable mounting 187 which is longitudinally adjustable for tensioning the conveyor chains.

In operation the folded trays having the rear portion uppermost and with the plaques lying beneath the trays move along the horizontal return run 129 of the conveyor circuit and are then lifted to a vertical position in the charging station 13 where the leading edge of the tray engages the arm 160 whereby the knife edge plates 156 are moved rearwardly and laterally outward to permit the passage of the horn member 18 of the tray and the plaque mounting 19 between the enrober conveyor 2 and the knife edge.

After the passage of the tray to the horizontal portion 133 of the circuit in which the tail trunnions 16 and head trunnions 14 support the tray on the track 134, the folded tray hanging vertically, the knife edge plates return to their position and the plaque 8 is drawn over the edge in close proximity to the enrober conveyor 2 whereby the goods are received on the plaques.

As the tray progresses by the action of the conveyor chains and enters the unfolding station 128 the tail trunnions 16 run down the track 135 while the mid trunnions 17 engage the vertical part 136a of the track 136. Further movement brings the mid trunnion 17 up the track 136, and through the gate 141, the forward portion 125 now lying more or less horizontal. At the same time the tail trunnions move down into the slot 140 so that the rear portion 126 of the tray hangs vertical. The tail trunnions 16 then move upwardly within the slot 140 and on to the inclined track 139 so that the rear part 126 of the tray is finally brought up into alignment with the front part 125, the tray now being adjacent the end of the table 31 so that the loaded plaque will be drawn on to the tray.

The loaded tray now descends to the lower run 144, entering the cooling chamber 10. After passing upwardly through the various laps within the cooling chamber the tray emerges at a high level where the tray passes beneath the table 145 while the loaded plaque passes above and is supported by the table.

At this position the tray descends and draws the plaque downwardly over the discharge knife edge 167 which has receded to allow the passage of the mounting 19 whereby the goods are transferred to the receiving conveyor 11. The tray again receives the empty plaque and moves downwardly around the return end of the course on to the return lap 129, now moving with the rear end foremost and finally reaching the folding station 147. At this point the tail trunnions 16 which are leading engage the stops 149 so that the mid trunnions and head trunnions rise up the inclined section 150 causing the tray to assume an angled condition. This continues until the mid trunnions 17 pass through the pivoted switch 151 and into the inverted U-shaped track 152. In riding up the wall of this track the portion 126 of the tray is lifted to remove the tail trunnions 16 from the stops 149, the parts 126 and 125 finally coming close together in collapsed or folded condition.

The folded tray now pivots about the mid trunnions 17 which causes the tail trunnions 16 and head trunnions 14 to pass through the pivoted switch 154 and to incline the folded tray so that the mid trunnions will move down the inclined track 153, the folded tray then moving on to the horizontal portion 129 of the return lap and again into the receiving station.

In both modifications described above the chain conveyors on which the trays are mounted are driven by any suitable form of drive and if desired the drive may be communicated at various points by driving means which are suitably synchronised.

It will be appreciated that conveyor chains are arranged at both sides of the machine and further that the various guiding tracks and rails and associated parts are also duplicated on either side so as to co-operate with the trunnions arranged on both sides of the trays.

It will be understood that the unloading of the plaques may be effected in two ways. The goods may be stripped from the plaques as above described and delivered upon a canvas or other receiving conveyor, from which they may be collected for packing or for other treatment. Alternatively the loaded plaques as a whole may be removed from their trays and carried away for conditioning or other treatment or to a mixed goods packing station. In such case, the plaques, as soon as the trays leave the cooling chamber may be unshipped from the mounting 19 and moved laterally onto a table which may be an extension of the table 40 or 145. A new plaque is then secured to the tray at any convenient position prior to its return through or below the cooling chamber.

We claim:

1. A machine for conveying sweetmeats, biscuits or other goods from an enrobing machine through a cooling stage, comprising a tray conveyor having a plurality of trays movable through a single circuitous track, including charging and discharging stations, plaques for receiving goods from the enrober, said plaques comprising flexible sheets conforming to the length of the trays, and means for detachably securing the plaques to the trays, whereby the plaques and trays travel together throughout said track.

2. A machine for conveying sweetmeats, biscuits or other goods from an enrobing machine through a cooling stage, comprising a tray conveyor having a plurality of trays movable through a single circuitous track including charging and discharging stations, plaques for receiving goods from the enrober, said plaques comprising flexible sheets adapted to be supported by the trays and conforming to the length thereof, means for detachably securing the plaques to the trays at one end thereof, a knife edge over which the plaques are drawn in receiving goods from the enrober, and means for securing the plaques to the trays whereby the plaques are drawn over said knife edge by the travelling trays, which move below the knife edge.

3. A machine for conveying sweetmeats, biscuits or other goods from an enrobing machine through a cooling stage, comprising a tray conveyor having a plurality of trays movable through a circuit, plaques for receiving goods from the enrober and adapted to be supported by said trays, a plaque supporting surface positioned along said circuit, said surface having a longitudinal slot, and means connecting the plaques to the trays, said connections extending through said slot while the plaques travel over said surface by the traction of the trays.

4. A machine for conveying sweetmeats, biscuits or other goods from an enrobing machine through a cooling stage, comprising a tray conveyor having a plurality of trays movable through a circuit, plaques for receiving goods from the enrober and adapted to be supported by said trays, a table positioned along said circuit for supporting loaded plaques, and means connecting an edge of each plaque to the respective tray in spaced relation thereto to permit intervention of said table between a plaque and its trays as the plaque is drawn over the table by the traction of the tray.

5. A machine for conveying sweetmeats, biscuits or other goods from an enrobing machine through a cooling stage, comprising a tray conveyor having a plurality of trays movable through a circuit including charging and discharging stations, flexible plaques for receiving goods from the enrober, a knife edge over which the plaques are drawn in receiving the goods, said knife edge comprising laterally separable parts, said trays having forward extending horns, means for securing the plaques to said horns, and means for separating the parts of the knife edge to permit the passage of said tray horns whereby the plaques are drawn over the knife edge by the trays.

6. A machine for conveying sweetmeats, biscuits or other goods from an enrobing machine through a cooling stage comprising a tray conveyor having a plurality of plaque supporting trays movable through a circuit including charging and discharging stations, flexible plaques for receiving goods from the enrober, a table positioned along said circuit in the charging station for supporting loaded plaques, said table being slotted longitudinally, a knife edge located between the enrober and said table over which the plaques are drawn, means for securing the plaques to the trays comprising a horn on the tray and a bar on the plaque, said knife edge being displaceable with respect to the enrober to permit passage of the plaque bar, and being formed in two parts laterally displaceable to permit passage of the tray horn, means for moving the knife edge with respect to the enrober, and means for laterally displacing the parts of the knife edge.

7. A plaque supporting tray having a horn projecting forwardly of the leading edge of the tray and upwardly above the upper surface of the tray, a laterally extending bar carried by said horn, said bar having means whereby a plaque may be secured to the tray so that its forward edge is spaced from the tray to permit the intervention of a charging table between the plaque and the tray as the plaque is drawn over the table by the tray which passes beneath.

8. A machine for conveying sweetmeats, biscuits or other goods from an enrobing machine through a cooling stage, comprising a plurality of plaques, means for supporting and moving the plaques through a circuit including a charging station, and means for permanently securing the plaques to said supporting means, whereby the plaques and supporting means travel together throughout the circuit and the plaques are moved during loading thereof by their connection with the supporting means.

9. A machine for conveying sweetmeats, biscuits or other goods from an enrobing machine through a cooling stage comprising a tray conveyor, having a plurality of rigid one piece plaque supporting trays movable through a circuit including charging and discharging stations, flexible plaques for receiving goods from the enrober, means for securing the plaques to the trays at the head thereof whereby the plaques and trays travel together throughout the circuit, means for turning over the trays prior to entering the charging station so that the plaques lie beneath, means whereby the trays during charging of the plaques travel tail foremost at an inclined angle, and means for tilting the trays after the plaques are charged to bring the trays right way up to receive the loaded plaque.

10. A machine for conveying sweetmeats, biscuits or other goods from an enrobing machine through a cooling stage, comprising a tray conveyor having a plurality of two piece plaque supporting trays movable through a circuit including charging and discharging stations, said trays comprising head and tail sections hinged together, flexible plaques for receiving goods from the enrober, means for securing the plaques to the leading edge of said head sections of the trays, whereby the plaques and trays travel together throughout the circuit, means whereby the trays enter the charging station with their sections folded back to back, and means for unfolding the tray sections to lie in alignment to receive the loaded plaques after passing the charging station.

11. A machine for conveying sweetmeats, biscuits or other goods from an enrobing machine through a cooling stage as claimed in claim 9, wherein guide rails and cams are provided adjacent said circuitous path, and the trays are provided with laterally projecting trunnions adapted to co-operate with said guide rails and cams to cause the trays to move in the predetermined paths.

12. In a machine for conveying sweetmeats, biscuits or other goods from an enrobing machine through a cooling stage as claimed in claim 9, endless conveyor chains conforming to said circuit, guide rails and cams located adjacent said circuitous path, said trays having laterally projecting trunnions adapted to co-operate with said guide rails and cams to cause the trays to move in the predetermined paths, said trunnions comprising a pair of trunnions by which the trays are secured to said conveyor chains, a pair of mid trunnions, and a pair of tail trunnions.

13. A machine for conveying sweetmeats, biscuits or other goods from an enrobing machine through a cooling stage as claimed in claim 10 wherein guide rails and cams are located adjacent said circuitous path, and the trays are provided with laterally projecting trunnions adapted to co-operate with said guide rails and cams to cause the trays to move in the predetermined paths.

14. In a machine for conveying sweetmeats, biscuits or other goods from an enrobing machine through a cooling stage as claimed in claim 10, endless conveyor chains conforming to said circuit, guide rails and cams located adjacent said circuitous path, laterally projecting trunnions on said trays co-operating with said guide rails and cams to cause the trays to move in the predetermined paths and the sections of the trays to fold and unfold, said trunnions comprising a pair of head trunnions on the head sections by which the trays are secured to said conveyor chains, a pair of mid trunnions on the head section and a pair of tail trunnions carried by the tail sections of the trays.

15. A machine for conveying sweetmeats, biscuits or other goods from an enrobing machine through a cooling stage, comprising a tray conveyor having a plurality of trays movable through a circuitous track including charging and discharging stations, plaques for receiving goods from the enrober, means for connecting the plaques to the trays, a knife edge located in the charging station adjacent the enrober, means for pivotally mounting the knife edge for displacement to or from the enrober, said knife edge being formed in two parts laterally displaceable relatively to one another, a pivoted lever having a cam slot, linkage connecting said lever to the parts of said knife edge, and a movable element co-operating with said cam slot to rock the lever and cause the movements of the knife edge.

16. A machine for conveying sweetmeats, biscuits or other goods from an enrobing machine through a cooling stage, comprising a tray conveyor having a plurality of plaque supporting trays movable through a circuitous track including a discharging station, plaques for receiving goods from the enrober, means for connecting the plaques to the trays so that the plaques are secured to the trays throughout the circuit, a receiving conveyor in the discharging station, a knife edge located adjacent the receiving conveyor and over which the plaques are drawn as the trays move beneath the knife edge.

17. A machine for conveying sweetmeats, biscuits or other goods from an enrobing machine through a cooling stage as claimed in claim 16 wherein the trays are provided with upwardly and forwardly projecting horns and the plaques are provided with bars, means for securing the bars to the horns, and wherein the knife edge is displaceably mounted with respect to the receiving conveyor to permit the passage of the plaque bars therebetween, said knife edge being formed in two parts laterally displaceable with respect to one another to permit the passage of the tray horns, and means for imparting said movements to the knife edge.

18. A machine for conveying sweetmeats, biscuits or other goods from an enrobing machine through a cooling stage as claimed in claim 16, upwardly and forwardly projecting horns on the trays, plaque bars to which the plaques are secured at their leading edges, means for securing the plaque bars to the tray horns, a two part knife edge displaceably mounted adjacent the receiving conveyor and over which the plaques are drawn by their connections to the trays, said parts of the knife edge being laterally movable relatively to one another to permit passage of the tray horns, a cam lever, operative connections between said lever and the knife edge parts, and means moving in synchronism with the travel of the trays to impart pivotal movements to the cam lever.

ALLAN ASHMEAD TUNLEY.
WILLIAM EDWARD PRESCOTT.